(12) United States Patent
Chujo et al.

(10) Patent No.: US 10,319,968 B2
(45) Date of Patent: Jun. 11, 2019

(54) BATTERY PACK

(71) Applicant: KABUSHIKI KAISHA TOYOTA JIDOSHOKKI, Aichi-ken (JP)

(72) Inventors: Yuki Chujo, Kariya (JP); Takayuki Kato, Kariya (JP); Hiromi Ueda, Kariya (JP); Fumihiko Ishiguro, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 137 days.

(21) Appl. No.: 15/106,646

(22) PCT Filed: Dec. 11, 2014

(86) PCT No.: PCT/JP2014/082878
§ 371 (c)(1),
(2) Date: Jun. 20, 2016

(87) PCT Pub. No.: WO2015/098553
PCT Pub. Date: Jul. 2, 2015

(65) Prior Publication Data
US 2017/0033341 A1 Feb. 2, 2017

(30) Foreign Application Priority Data
Dec. 26, 2013 (JP) .................. 2013-270537

(51) Int. Cl.
*H01M 2/12* (2006.01)
*H01M 10/0525* (2010.01)
(Continued)

(52) U.S. Cl.
CPC ....... *H01M 2/1229* (2013.01); *H01M 2/1077* (2013.01); *H01M 2/1223* (2013.01);
(Continued)

(58) Field of Classification Search
CPC combination set(s) only.
See application file for complete search history.

(56) References Cited

U.S. PATENT DOCUMENTS

| 5,750,277 A | * | 5/1998 | Vu | ........................ | H01H 37/043 |
| | | | | | 429/61 |
| 6,342,826 B1 | * | 1/2002 | Quinn | .................. | H01H 35/343 |
| | | | | | 337/13 |

(Continued)

FOREIGN PATENT DOCUMENTS

| JP | 2007-12485 | 1/2007 |
| JP | 2012-104471 | 5/2012 |

(Continued)

OTHER PUBLICATIONS

International Search Report for PCT/JP2014/082878 dated Jan. 20, 2015.

(Continued)

*Primary Examiner* — Kaity V Chandler
(74) *Attorney, Agent, or Firm* — Greenblum & Bernstein, P.L.C.

(57) ABSTRACT

A battery pack has a sealed case. Battery modules are housed in the sealed case. Each battery module contains multiple battery cells. The sealed case has a main body having an opening. The opening in the main body is closed by a rectangular plate-shaped lid member. The lid member has a first releasing portion and a second releasing portion, which are opened when the internal pressure of the sealed case increases. The second releasing portion is arranged below the first releasing portion in the vertical direction.

12 Claims, 3 Drawing Sheets

(51) Int. Cl.
    *H01M 10/34*     (2006.01)
    *H01M 2/10*     (2006.01)

(52) U.S. Cl.
    CPC ..... *H01M 2/1241* (2013.01); *H01M 10/0525* (2013.01); *H01M 10/345* (2013.01); *H01M 2200/20* (2013.01)

(56) References Cited

U.S. PATENT DOCUMENTS

| | | | |
|---|---|---|---|
| 6,410,186 B1* | 6/2002 | Tucholski | H01M 2/023 429/171 |
| 6,632,559 B1* | 10/2003 | Kawamura | H01M 2/1241 429/56 |
| 6,696,196 B1* | 2/2004 | Eilers | H01M 2/1252 429/163 |
| 9,583,783 B2* | 2/2017 | Takatsuka | H01M 2/34 |
| 2001/0027807 A1* | 10/2001 | Morishita | H01M 2/1241 137/68.27 |
| 2008/0145747 A1* | 6/2008 | Wu | H01M 2/0202 429/56 |
| 2010/0233520 A1* | 9/2010 | Suzuki | H01M 2/0277 429/56 |
| 2010/0266879 A1* | 10/2010 | Byun | H01M 2/1235 429/53 |
| 2011/0135976 A1* | 6/2011 | Byun | H01M 2/04 429/56 |
| 2011/0305929 A1* | 12/2011 | Byun | H01M 2/345 429/61 |
| 2012/0040214 A1* | 2/2012 | Kim | H01M 2/1241 429/56 |
| 2012/0114993 A1 | 5/2012 | Park et al. | |
| 2012/0263982 A1 | 10/2012 | Yasui et al. | |
| 2012/0308855 A1* | 12/2012 | Shimizu | H01M 2/0426 429/53 |
| 2014/0205877 A1* | 7/2014 | Kim | H01M 2/0426 429/82 |
| 2015/0024241 A1* | 1/2015 | Kim | H01M 2/0404 429/56 |
| 2015/0104672 A1* | 4/2015 | Cai | H01M 2/345 429/7 |
| 2015/0132618 A1* | 5/2015 | Han | H01M 2/345 429/53 |
| 2015/0287977 A1* | 10/2015 | Lee | H01M 2/345 429/89 |
| 2016/0036032 A1* | 2/2016 | Zhang | H01M 2/12 429/61 |

FOREIGN PATENT DOCUMENTS

| | | |
|---|---|---|
| JP | 2013-89375 | 5/2013 |
| WO | 2012/073438 | 6/2012 |

OTHER PUBLICATIONS

Written Opinion of the International Searching Authority for PCT/JP2014/082878 dated Jan. 20, 2015.
International Preliminary Report on Patentability for PCT/JP2014/082878 dated Jun. 28, 2016.

* cited by examiner

US 10,319,968 B2

BATTERY PACK

TECHNICAL FIELD

The present invention relates to a battery pack.

BACKGROUND ART

Battery packs have been known that are configured to accommodate battery cells in a sealed case. In this type of battery pack, the internal pressure of the sealed case needs to be lowered when the internal pressure is high.

Patent Document 1 discloses a battery module that has a housing serving as a sealed case and rechargeable batteries serving as battery cells accommodated in the housing. A gas discharging member, which is opened at a preset pressure, is attached to each rechargeable battery. The housing has a gas discharging hole. A valve member is attached to the housing to close the gas discharging hole. The battery module is configured such that the valve member is opened when the internal pressure of the housing reaches a preset pressure.

In this battery module, when the gas discharging members of the rechargeable batteries are opened, various types of gases are discharged from the gas discharging members. Since the weights of the gases discharged from the gas discharging members differ depending on the types, the distribution of the gases in the housing becomes uneven. Thus, even if the internal pressure of the housing is high and the valve member is opened, some of the various types of gases may remain in the housing.

PRIOR ART DOCUMENT

Patent Document

Patent Document 1: Japanese Laid-Open Patent Publication No. 2012-104471

SUMMARY OF THE INVENTION

Problems that the Invention is to Solve

Accordingly, it is an objective of the present invention to provide a battery pack that readily discharges various types of gases.

Means for Solving the Problems

To achieve the foregoing objective and in accordance with a first aspect of the present invention, a battery pack is provided that includes a plurality of battery cells, each of which includes a case having a pressure relief valve and an electrode assembly accommodated in the case, a sealed case, which accommodates the battery cells, and releasing portions, which are provided in the sealed case and release an internal pressure of the sealed case. The releasing portions include a first releasing portion and a second releasing portion, which is located below the first releasing portion in a vertical direction.

When the pressure relief valves of the battery cells are opened, various types of gases are discharged to the interior of the sealed case. At this time, the heavier the gas, the lower becomes the position in the vertical direction at which that gas stays. Also, the lighter the gas, the higher becomes the position in the vertical direction at which that gas stays. Thus, the distribution of the gases is uneven in the sealed case. In this regard, the above configuration has the releasing portions at different heights in the vertical direction. Therefore, even if the distribution of the gases is uneven in the sealed case, various types of gases can be readily discharged from the sealed case.

In the above described battery pack, the first releasing portion and the second releasing portion are preferably provided in a same side wall that constitutes the sealed case.

With this configuration, the releasing portions are structured to be opened in the same direction. Thus, when the relief valves are opened, gases are discharged in the same direction from the sealed case. This restrains the gases from being diffused.

MODES FOR CARRYING OUT THE INVENTION

A battery pack according to one embodiment of the present invention will now be described with reference to FIGS. 1 to 4.

Figure 1:
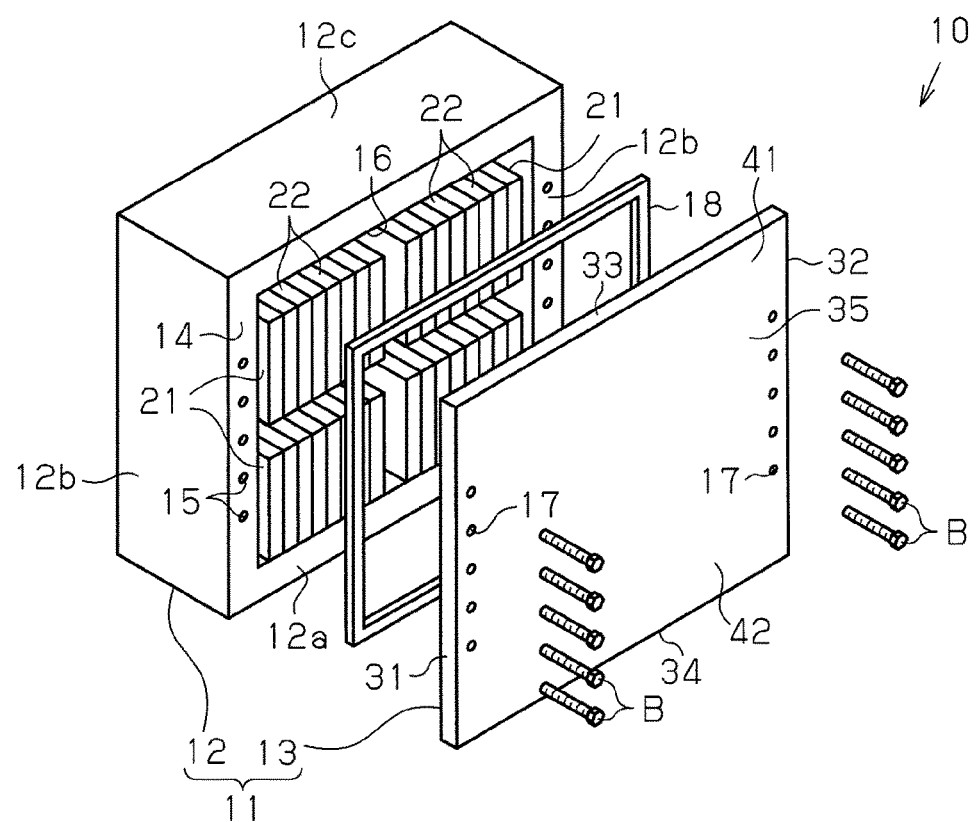
FIG. 1 is an exploded perspective view illustrating a battery pack according to one embodiment of the present invention.

As shown in FIG. 1, a battery pack 10 includes a sealed case 11. The sealed case 11 accommodates battery modules 21. Each battery module 21 includes battery cells 22. The sealed case 11 includes a main body 12 and a rectangular plate-shaped lid member 13. The main body 12 is shaped as a rectangular tube with a closed end has an opening 16. The main body 12 has a rectangular plate-shaped bottom plate 12a, side walls 12b, which extend vertically from three sides of the bottom plate 12a, a top plate 12c, which is placed on the upper ends of the three side walls 12b on the side opposite from the bottom plate 12a. The sealed case 11 has an opening 16, which is surrounded by the bottom plate 12a, the side walls 12b, and the top plate 12c.

The lid member 13 is attached to an opening edge 14, which forms the opening 16. The lid member 13 is attached to close the opening 16. The lid member 13 serves as a side wall of the sealed case 11. The lid member 13 is joined to the opening edge 14 of the main body 12 with bolts B. The opening edge 14 has threaded holes 15, into which the bolts B are threaded. The lid member 13 has insertion holes 17, into which the bolts B are inserted. The bolts B are inserted into the insertion holes 17 and threaded into the threaded holes 15 to join the lid member 13 to the opening edge 14. A sealing member 18 is arranged between the opening edge 14 and the lid member 13. The lid member 13 has four ends 31 to 34. The first end 31 and the second end 32 each extend in the vertical direction. The third end 33 and the fourth end 34 are different from the first end 31 and the second end 32.

Figure 2:
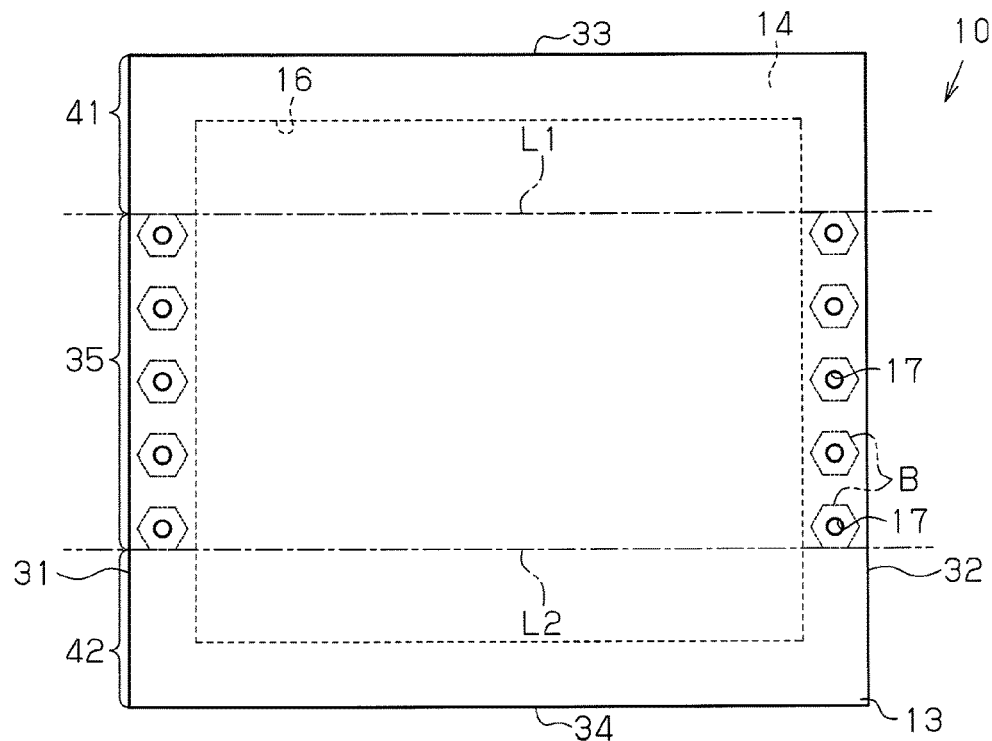
FIG. 2 is a front view showing the battery pack.

As shown in FIG. 2, the bolts B are inserted into the insertion holes 17 at the first end 31 and the insertion holes 17 at the second end 32. The insertion holes 17, into which the bolts B are inserted, are formed in parts of the first end 31 and the second end 32, but are not formed in the corners of the lid member 13. The bolts B are inserted into the insertion holes 17 while being arranged in a direction perpendicular to the third end 33 and the fourth end 34. No insertion holes 17 for receiving bolts B are formed at the third end 33 or the fourth end 34.

The bolts B at the first end 31 and the second end 32 are fastened by a predetermined fastening amount. The fastening amounts of the bolts B are set to values at which the joint between a part of the lid member 13 and the opening edge 14 is maintained even if the internal pressure of the sealed case 11 increases to a level at which a first releasing portion 41 and a second releasing portion 42, which will be discussed below, are deformed to start discharging gas from the sealed case 11.

A first imaginary line L1 shown in FIG. 2 connects one of the bolts B at the first end 31 that is closest to the third end 33 to one of the bolts B at the second end 32 that is closest to the third end 33. Specifically, the first imaginary line L1 connects the part of the bolt B at the first end 31 that is closest to the third end 33 to the part of the bolt B at the second end 32 that is closest to the third end 33. Also, a second imaginary line L2 shown in FIG. 2 connects one of the bolts B at the first end 31 that is closest to the fourth end 34 to one of the bolts B at the second end 32 that is closest to the fourth end 34. Specifically, the second imaginary line L2 connects the part of the bolt B at the first end 31 that is closest to the fourth end 34 to the part of the bolt B at the second end 32 that is closest to the fourth end 34. In this case, an area on the lid member 13 between the first imaginary line L1 and the second imaginary line L2 is a joint portion 35.

The lid member 13 has the first releasing portion 41 in the area between the first imaginary line L1 and the third end 33 and the second releasing portion 42 in the area between the second imaginary line L2 and the fourth end 34. When the internal pressure of the sealed case 11 increases, the third end 33 and the fourth end 34 of the lid member 13, which are not joined to the opening edge 14 with the bolts B, are deformed away from the opening edge 14. At this time, the lid member 13 is deformed with the first imaginary line L1 and the second imaginary line L2 serving as pivots.

That is, the lid member 13 has releasing portions, which are deformed away from the opening edge 14 to discharge gas from the sealed case 11 when the internal pressure of the sealed case 11 increases. The releasing portions include the first releasing portion 41, which is the area between the first imaginary line L1 and the third end 33, and the second releasing portion 42, which is the area between the second imaginary line L2 and the fourth end 34. The second releasing portion 42 is located below the first releasing portion 41 in the vertical direction. The fastening amounts and the pressure receiving areas of the bolts B are adjusted such that the first releasing portion 41 and the second releasing portion 42 are opened simultaneously. When the first releasing portion 41 and the second releasing portion 42 are opened, the joint between the joint portion 35 and the opening edge 14 is maintained.

Figure 3:
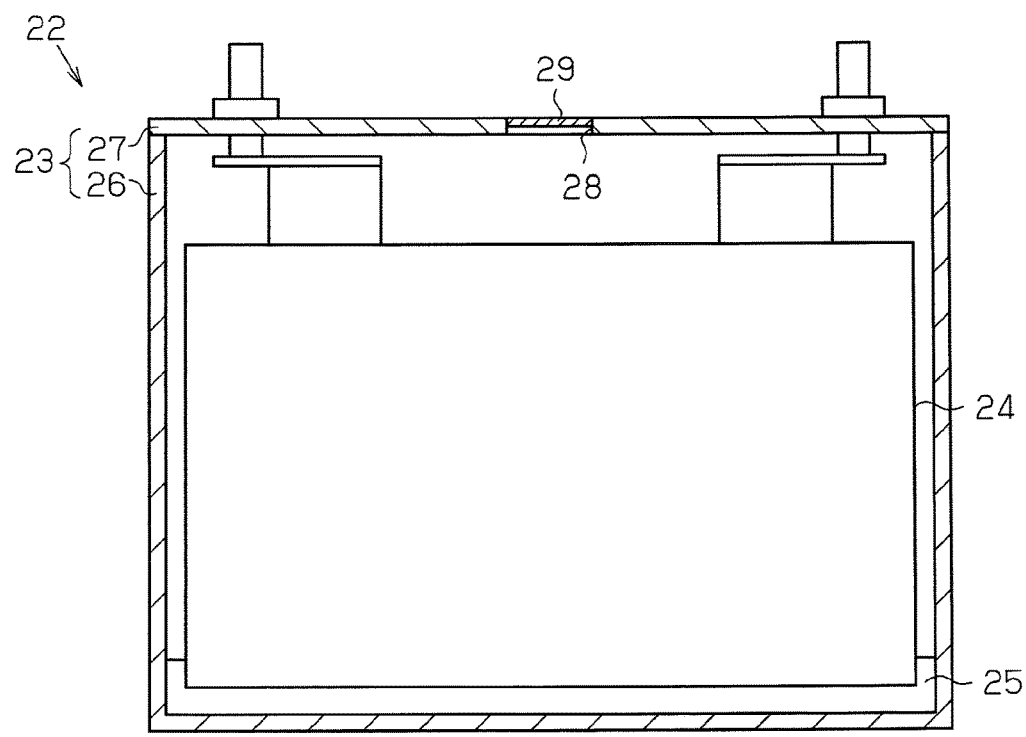
FIG. 3 is a cross-sectional view showing a battery cell.

The battery cell 22 may be, for example, a lithium-ion rechargeable battery or a nickel-metal hydride battery. As shown in FIG. 3, the battery cell 22 includes a battery case 23, an electrode assembly 24 accommodated in the battery case 23, and electrolytic solution 25. The battery case 23 includes a rectangular box-shaped case main body 26 and a rectangular plate-shaped lid 27. The case main body 26 accommodates the electrode assembly 24 and the lid 27 closes the opening of the case main body 26. The lid 27 has a hole 28, which extends through the lid 27 in the thickness direction. A pressure relief valve 29 is provided in the hole 28. The pressure relief valve 29 is opened when the internal pressure of the battery case 23 exceeds a specified pressure.

In this case, the specified pressure is set such that, when the internal pressure of the battery case 23 increases, the pressure relief valve 29 is broken before the battery case 23 is broken.

Operation of the above-described battery pack 10 will now be described.

When there is an abnormality in any of the battery cells 22, gas is generated in the battery case 23 and the internal pressure of the battery case 23 increases. When the internal pressure of the battery case 23 exceeds the specified pressure, the pressure relief valve 29 of the battery case 23 is broken. Accordingly, the gas in the battery case 23 is discharged to the interior of the sealed case 11. The gas discharged from the battery case 23 differs depending on the type of the battery cell 22. If the battery cells 22 are lithium-ion rechargeable batteries, gases such as hydrogen, oxygen, methane, and ethylene are discharged. In the descending order by weight, the gases are listed in the following order: ethylene, methane, oxygen, and hydrogen. The greater the weight of the gas, the lower the position where that gas stays becomes. Also, the lighter the weight of the gas, the higher the position where that gas stays is. Accordingly, in the sealed case 11, hydrogen, oxygen, methane, ethylene are distributed in that order from the top.

Figure 4:
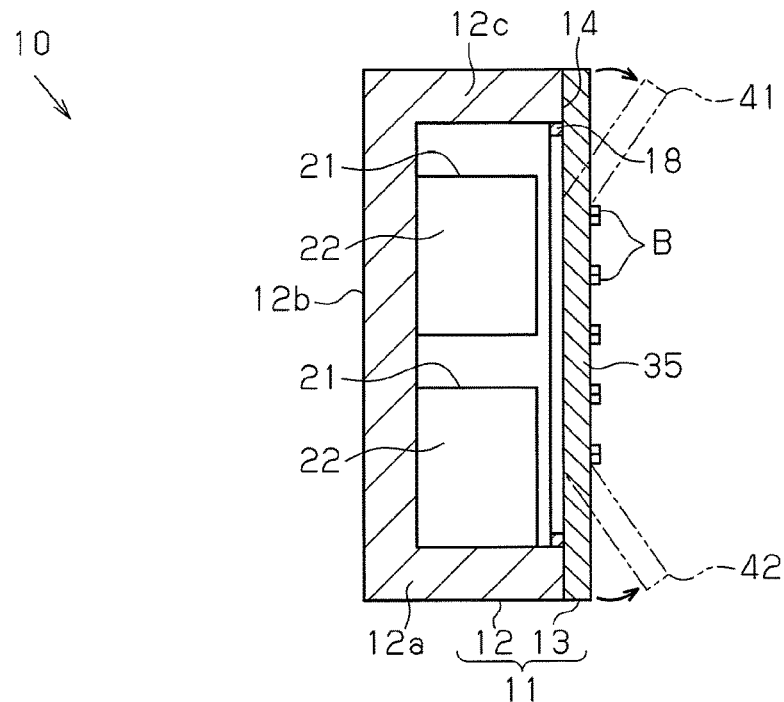
FIG. 4 is an explanatory diagram showing operation of the battery pack.

As the internal pressure of the sealed case 11 increases, the first releasing portion 41 and the second releasing portion 42 are deformed away from the opening edge 14 as shown in FIG. 4. Then, a clearance is formed between the first releasing portion 41 and the opening edge 14 and between the second releasing portion 42 and the opening edge 14. The gases in the sealed case 11 are discharged through the clearances.

Mainly light gases such as hydrogen and oxygen are discharged through the first releasing portion 41, which is located in the upper section. In contrast, mainly heavy gases such as methane and ethylene are discharged through the second releasing portion 42, which is located in the lower section.

Also, the original shapes of the first releasing portion 41 and the second releasing portion 42 are restored by the elastic force of the lid member 13. In reality, the amount of deformation of the lid member 13 is small. However, for purposes of illustration, the deformation of the lid member 13 is exaggerated in FIG. 4. Although only hydrogen, oxygen, methane, and ethylene are listed as gases discharged from the battery cells 22, battery cells that discharge a greater number of types of gases may be employed.

For example, to readily discharge various types of gases from the battery case 23 of each battery cell 22, the battery case 23 may have two or more pressure relief valves at different positions in the vertical direction. However, since a great area in the battery case 23 is occupied by the electrode assembly 24, the battery case 23 only has small number of clearances inside. This hinders flows of gases. Therefore, the distribution of the gases is not significantly uneven in the battery cell 22.

The battery case 23 contains the electrolytic solution 25. Thus, if a pressure relief valve is provided in the lower section, the pressure relief valve may always be in contact with the electrolytic solution 25, which is not desirable. Also, if a pressure relief valve is provided in the lower section, opening the pressure relief valve may cause the electrolytic solution 25 to leak through the pressure relief valve. Therefore, it is not feasible to provide the battery case 23 of each battery cell 22 with two or more pressure relief valves at different positions in the vertical direction as in the present invention, and such a structure would have few advantages.

In contrast, in the battery pack 10, which accommodates multiple battery cells 22, adjacent battery modules 21 need to be spaced apart to ensure the insulation from each other. Thus, the sealed case 11 has a large number of clearances inside, which facilitates flows of gases. Also, liquid is rarely stored in the sealed case 11 unless the battery cells 22 discharge the electrolytic solution 25. Thus, even if the second releasing portion 42 is opened, liquid rarely leaks to the outside.

Accordingly, the above described embodiment provides the following advantages.

(1) The sealed case 11 has the first releasing portion 41 and the second releasing portion 42 at different positions in the vertical direction. Therefore, even if the distribution of the gases is uneven in the sealed case 11, the first releasing portion 41 and the second releasing portion 42 readily discharge various types of gases of different weights.

(2) The first releasing portion 41 and the second releasing portion 42 are provided in the lid member 13. This allows the first releasing portion 41 and the second releasing portion 42 to be opened in the same direction. Thus, when the first releasing portion 41 and the second releasing portion 42 are opened, the gases are discharged in the same direction from the sealed case 11. This restrains the gases from being diffused.

The present embodiment may be modified as follows.

Figure 5A:
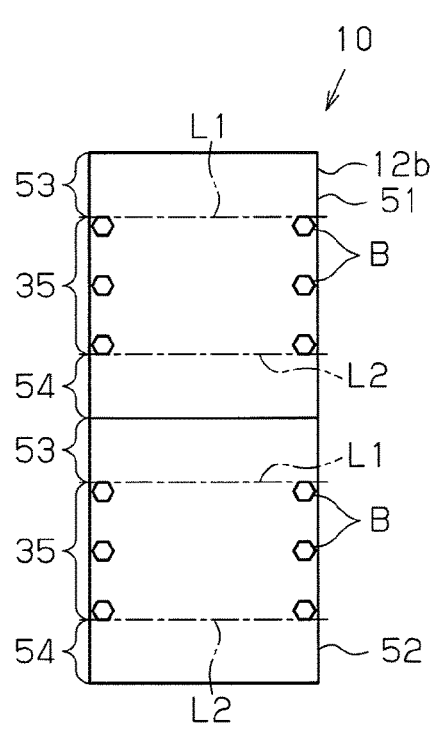
FIGS. 5A and 5B are diagrams showing a battery pack according to a modification.
Figure 5B:
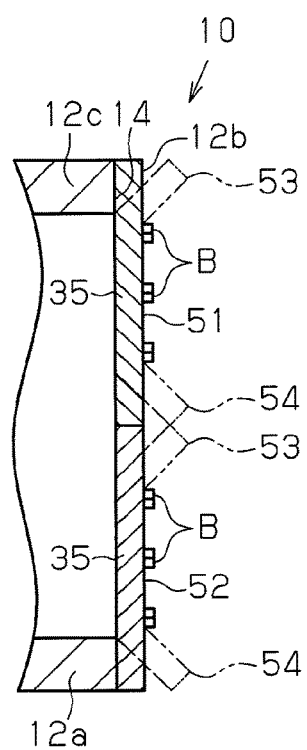

As shown in FIGS. 5A and 5B, one of the side walls 12b of the sealed case 11 may be constituted by two lid members 51, 52. The lid members 51, 52 each have a first releasing portion 53 in the upper section and a second releasing portion 54 in the lower section. When the internal pressure of the sealed case 11 is increased, the first and second releasing portions 53, 54 are deformed. In this case, the releasing portions are provided in four sections in one of the side walls 12b of the sealed case 11. That is, the number of releasing portions may be any number greater than one. Alternatively, the lid members 51, 52 may each have a single releasing portion.

In the above illustrated embodiment, the lid member 13 is deformed to provide releasing portions. However, releasing portions may be provided by other structures. For example, a valve or a thin portion that is designed to be broken when the internal pressure of the sealed case 11 is increased may be employed. In this case also, the number of releasing portions may be any number greater than one.

The first releasing portion 41 and the second releasing portion 42 may be provided in different ones of the walls that constitute the sealed case 11. For example, the first releasing portion 41 may be provided in the top plate 12c, and the second releasing portion 42 may be provided in one of the side walls 12b. Alternatively, the first releasing portion 41 may be provided in one of the side walls 12b, and the second releasing portion 42 may be provided in another side wall 12b.

The battery cells 22 may be, for example, nickel-metal hydride batteries.

The lid member 13 may be fixed to the main body 12, for example, with an adhesive.

The invention claimed is:

1. A battery pack comprising:
a plurality of battery cells, each of which includes a case having a pressure relief valve and an electrode assembly accommodated in the case;
a sealed case, which accommodates the battery cells; and
releasing portions, which are provided in the sealed case and release an internal pressure of the sealed case,
wherein each of the releasing portions is formed by a lid member, wherein the lid member forms a side wall of the sealed case, and wherein the lid member is attached to an opening edge of the sealed case by a joint portion,
wherein the releasing portions include a first releasing portion and a second releasing portion, which is located below the first releasing portion in a vertical direction,
wherein the first releasing portion and the second releasing portion are provided at respective ends of the lid member in the vertical direction, and wherein when the first releasing portion and the second releasing portion are opened the first releasing portion and the second releasing portion are not in contact with the opening edge.

2. The battery pack according to claim 1,
wherein the first releasing portion and the second releasing portion are provided in a same side wall that constitutes the sealed case.

3. The battery pack according to claim 2,
wherein the lid member has a size required for closing the entire opening of the sealed case,
wherein the first releasing portion is provided at an upper end of the lid member in the vertical direction, and
wherein the second releasing portion is provided at a lower end of the lid member in the vertical direction.

4. The battery pack according to claim 1,
wherein the first releasing portion and the second releasing portion are deformable to form a clearance between the lid member and the opening edge, and
wherein, after deformation, in an elastic region of the lid member, the first and second releasing portions recover the original shapes of the first and second releasing portions, respectively.

5. The battery pack according to claim 1, wherein the lid member has a first end and a second end, wherein the first end and the second end extend in the vertical direction, and wherein a plurality of bolts are arranged along each of the first end and the second end.

6. The battery pack according to claim 5, wherein an uppermost bolt on the first end and an uppermost bolt on the second end define a first imaginary line connected between the uppermost bolt on the first end and the uppermost bolt on the second end,
wherein a lowermost bolt on the first end and a lowermost bolt on the second end define a second imaginary line connected between the lowermost bolt on the first end and the lowermost bolt on the second end, and
wherein an area of the lid member between the first imaginary line and the second imaginary line is the joint portion.

7. The battery pack according to claim 1, wherein the lid member is rectangular.

8. The battery pack according to claim 7, further comprising a plurality of bolts on opposite sides of the lid member.

9. The battery pack according to claim 8, wherein the plurality of bolts on opposite sides of the lid member include uppermost bolts and lowermost bolts, and wherein the uppermost bolts and the lowermost bolts define the joint portion of the lid member.

10. The battery pack according to claim 1, wherein the lid member comprises a flexible layer of material, and wherein the first releasing portion, the joint portion, and the second releasing portion are portions of the lid member and together form the lid member.

11. The battery pack according to claim 1, wherein the joint portion is arranged between the first releasing portion and the second releasing portion in the vertical direction.

12. The battery pack according to claim 1, wherein when the first releasing portion and the second releasing portion are opened, a joint between the joint portion and the opening edge is maintained.

* * * * *